June 13, 1972          G. E. KAYE          3,669,753
RESERVE CELL, SPRING-CONTROLLED
Filed Sept. 22, 1970
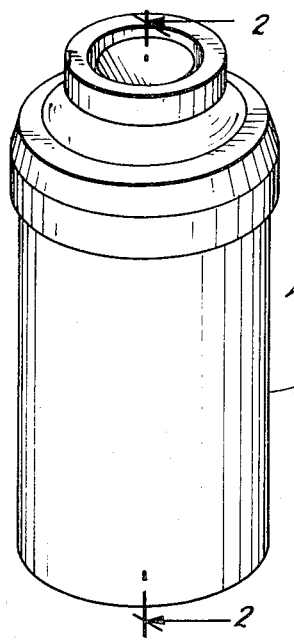
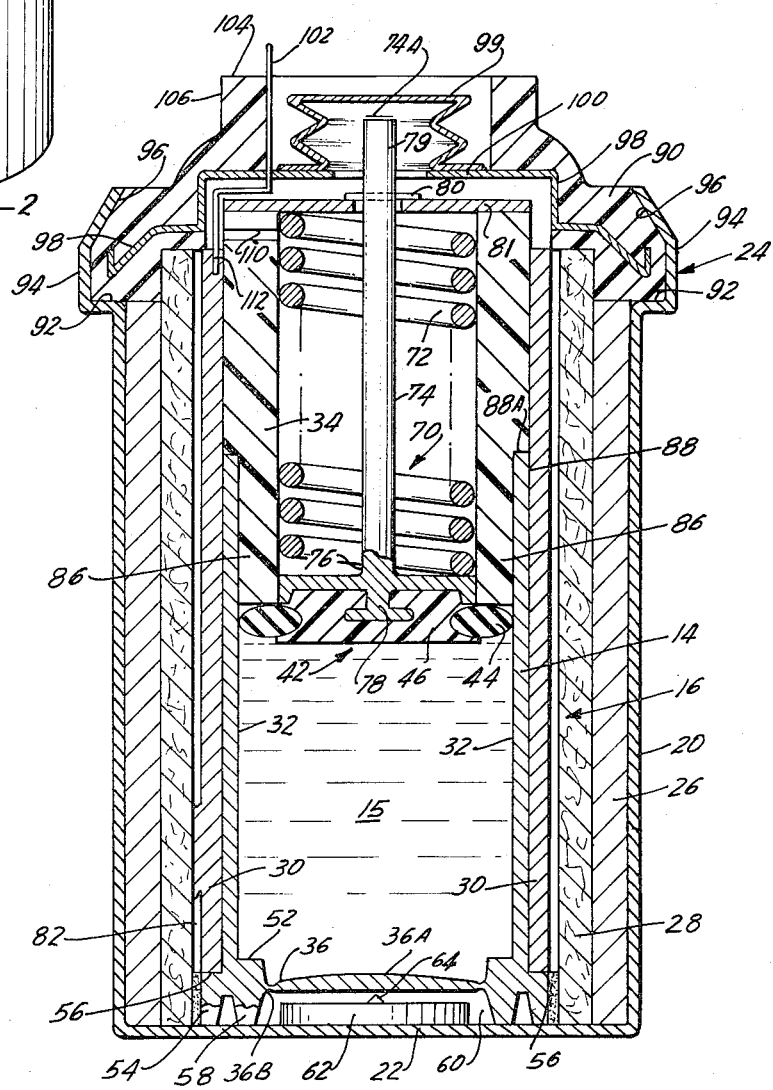
INVENTOR
Gordon E. Kaye
BY
ATTORNEY

United States Patent Office 3,669,753
Patented June 13, 1972

3,669,753
RESERVE CELL, SPRING-CONTROLLED
Gordon E. Kaye, Irvington, N.Y., assignor to
P. R. Mallory & Co., Inc., Indianapolis, Ind.
Filed Sept. 22, 1970, Ser. No. 74,394
Int. Cl. H01m 21/10
U.S. Cl. 136—114                                  8 Claims

ABSTRACT OF THE DISCLOSURE

A reserve type cell with a charge volume of electrolyte held confined in a closed cylinder with a frangible end wall closure and a front piston closure operable by a spring held compressed until cell activation is desired, at which time the spring is released to hydrostatically press the fluid electrolyte to fracture the bottom frangible end and to express the electrolyte to operating cell space surrounding the electrolyte cylinder and the actuating spring.

---

This invention relates to a reserve cell that is normally kept and stored in unactivated condition, by keeping the electrolyte isolated and separated from the anode and the cathode until there is a desire for its utilization, at which time the cell is then put into activated condition by releasing the electrolyte from its isolated condition and location, usually in a separate closed container, and then permitting the electrolyte to enter the space between the anode and the cathode to serve as an active electrolyte to activate the cell.

In conventional cases where a battery cell is not immediately and currently active and is stored until it is desired to be used, the cell may not be called upon for use in service for substantial periods of time. In the meantime the cell is in a chemically active state, and internal chemical action may proceed in a way to cause some deterioration of the battery to such an extent as to render the battery less effective, with less voltage and less power capacity than is available and desired from a normal cell, even though the battery cell has actually not been used while standing idle.

The object of this invention is to provide a reserve battery cell which is normally kept inactive by keeping the electrolyte isolated in a container separated from the cathode-anode assembly until the battery cell is to be utilized, and then at that time the electrolyte from the isolated container is released and directed into the cell space between the cathode and the anode to provide an active ionizing and conducting medium for the cell.

Another object of the invention is to provide a reserve type cell in which the electrolyte is confined and stored in a container, such as a closed cylinder, so longer as the battery cell is not to be placed in use, and in which the electrolyte is moved from its storage cylinder into the operating space of the cell between the cathode and the anode to render the cell activated and ready to deliver electrical energy.

Another object of the invention is to provide a reserve type cell, in which a volume of electrolyte is stored in a separate cylindrical vessel, and potential energy is stored in a compressed spring until activation of the cell is desired, at which time the spring is released to force the electrolyte into the operative region of the cell between anode and cathode, to render the cell active.

While the cell is inactive, the electrolyte is held in a concentric cylinder, closed at its bottom by a frangible disc, and closed at its top by a piston with a sealing O-ring. A compressed spring rests on the piston but is restrained in compressed condition by a shear pin on a supporting piston rod that extends co-axially to the outer upper end of the cell. The cell elements, anode spacer and depolarizer, are concentrically disposed in a cathode can to surround the electrolyte cylinder and the actuating spring assembly. The can is closed at the bottom and open at the top to receive the cell components, after which the can is closed by a suitable insulating closure which embodies a metallic re-inforcing element to which a bellows top is bonded to hermetically seal the cell. The bellows provides an element with sufficient movement to push the piston rod to shear the holding pin and thereby release the compressed spring to move the piston and force the electrolyte out into the operating cell space.

The details of construction of the cell of this invention are more fully described in the following specification, and shown in the drawings, in which FIG. 1 is a vertical perspective view of the cell; and FIG. 2 is a vertical section taken along the plane of lines 2—2 of FIG. 1;

As shown in FIG. 1, a reserve cell 10 of this invention comprises generally an elongated cell structure 12 which is normally in dry condition while inactive. As shown in FIG. 2, the cell further comprises a separate container or vial assembly 14, which in the normal inactive state of the cell keeps a predetermined volume of electrolyte 15 isolated from the structural electrode elements of the cell until operation of the cell is desired. At that time, the vial assembly is actuated, manually, with an impact or pressure force to fracture the vial that contains the electrolyte to release and express the electrolyte from its vial into the electrode structure 16, to render the cell activated and ready to deliver energy.

The electrode structure 16, of the cell 10, comprises generally a cathode can 20 closed at the bottom 22 and initially open at the top 24. The cathode can 20 is lined with depolarizer elements or material 26 to snugly engage the inner surface of the cathode can 20.

Lengthwise along the inner surface of the depolarizer material 26 is disposed a cylinder of absorbent material 28, as a spacer between the depolarizer 26 and an anode cylinder 30. The cathode can 12 may be formed of drawn cold rolled steel sheet metal and the anode 30 may be formed of zinc which is one of several anodic materials providing a natural voltage differential to the cathodic material such as $MnO_2$, $HgO$, and may be formed as a solid continuous structure, or as a perforated, or as a porous, structure which is formed to be inherently self-supporting and form-preserving to permit manual handling and assembly during manufacture.

In the central space within said anode 30 is disposed said vial assembly 14, which includes a plastic cylindrical structure consisting of a lower plastic cylinder 32 and an upper plastic cylinder 34. The lower cylinder 32 is closed at its bottom or floor 36, that is shaped to be frangible and readily displaced by a pressure force on the disk shaped button 36A on said floor 36. The lower cylinder 32 is otherwise shaped as an elongated cylindrical cup, within which is disposed a volume of fluid electrolyte 15, which is sealed between the bottom 36 of the cylinder and an upper piston assembly 42, which, as here shown, consists of an elastomeric O-ring 44, or it may be of closed packing or of a U-shaped ring of appropriate dimension, to normally snugly engage the inner peripheral surface of the lower cylinder 32 to serve as a closure seal against that surface. Said piston assembly 42 further comprises a pressure piston plate or body 46 having a curved outer peripheral edge surface shaped to seat on and engage the inner annular surface of the elastomeric O-ring 44, so that axial pressure on the piston 46 will press the O-ring radially outward to engage the inner peripheral surface of the lower cylinder 32 under pressure, while at the same time forcing the elastomeric O-ring axially downward against the electrolyte to establish a hydrostatic pressure on the electrolyte that will in turn react on the frangible disk 36 at the bottom of the cylinder 32.

In order to obtain a multiplying action to amplify the hydrostatic pressure of the electrolyte on the button 36, that frangible button is formed to be located in a circular area of maximum dimension, and is spaced forwardly in the cylinder 32 within an annular inner step formation 52 at the bottom of cylinder 32. A ring of reduced section 36B encircles the frangible bottom button region 36.

The bottom of said cylinder 32 is further provided with an external circularly toothed bottom foundation 54 to provide an insulating supporting shoulder or step 56 to support the metallic anode 30 in insulated spacing from the bottom 22 of the metal cathode can.

The bottom of the cylinder 32 is further provided with a second inner concentric toothed ring 58 directly beneath the inner step 52 to provide relatively confined circular space 60 directly beneath said frangible button 36, to accommodate a mass weight 62 having a sharpened point 64 which projects upward from the top surface of the mass weight 62 to serve as a fracturing element to fracture said bottom button 36 when that circular button portion of the cylinder 32 is depressed by the hydrostatic pressure on the electrolyte by pressure on said piston assembly 42 at the top surface of the fluid electrolyte 40.

Said hydrostatic pressure generated and is impressed on the electrolyte 40 by an energy-storing and force-generating assembly 70, which includes a helical compression spring 72 in combination with a piston rod 74, anchored at its lower end 76 to a molded insert 78 in the piston element 46 and arranged to be normally restrained at its upper end 79 against said spring 72, by a shear pin 80, which seats on a closure cap 81 at the upper end of said upper cylinder 34 to provide a reaction seat for the shear pin to hold the piston rod 74 normally restrained in raised position, to hold the helical spring 72 in compressed condition with stored potential energy. When the shear pin 80 is broken by a pressure force or impact force on the outer end 74A of the piston rod 74, the compressed spring 72 is released to permit that spring 72 to exert pressure on the piston body plate 46 to develop a hydrostatic pressure on the electrolyte 15, which hydrostatic pressure is then transmitted to the frangible bottom button 36 to flex and bow that button 36 sufficiently to engage the sharp point 64 on the fracturing weight 62 and be fractured by said sharp point 64. The border ring 36B is also sufficiently weak in section to be fractured possibly before the sharp point 64 is effective.

When the bottom button 36 is thus fractured, the continuing pressure of the spring 72 forces the electrolyte out of the bottom vial cylinder 32 into the space 60 around the weight 62, and then out through the spaces between the toothed ring 58 and the encircling toothed supporting ring 54 for the anode 30, to permit the electrolyte to move freely towards the absorbent spacer 28. In order to permit fast movement of the electrolyte to its operating region between the anode and the cathode, and into the absorbent spacer, the outer peripheral surface of said anode 30 is formed to embody longitudinal flutes 82.

Thus, the fluid electrolyte under the hydrostatic pressure from the spring 72 is forced to move upward into said flutes 82 in the outer surface of the anode 30. From those flutes 82, the electrolyte may then freely pass into the absorbent spacer material 28 to wet and saturate that absorbent spacer 28 to enable it to serve as an ionic transfer medium between the anode and the depolarizer cathode combination.

For the assembling of the bottom cylinder 32 and the upper cylinder 34 of the vial assembly 14, the upper cylinder 34 has a depending cylindrical sleeve 86 to fit snugly and co-axially into the upper end of the bottom cylinder 32. With such assembly, the two plastic cylinders 32 and 34 are appropriately sealed and bonded at their engaging annular and cylindrical surfaces 88 and 88A to prevent any unwanted seepage from the volume of electrolyte out into the space occupied by the anode-cathode structure, until activation of the cell is desired. Thus, any limited seepage that might nevertheless occur beyond the surface of the engagement between the elastomeric ring 44 and the inner surface of the lower vial cylinder 32, will be confined to the space within the upper vial cylinder 34.

In order to finally seal the cell after the assembling of the structural electrode parts and the electrolyte vial assembly, a single top grommet assembly 90 is inserted in the top open end of the outer cathode can 20 and is seated on an annular seat 92 surrounded by an axially extending apron 94 that is to be crimped over the outer peripheral surface 96 and upper edge of the grommet 90, which is made of a suitable insulating material such as nylon for example. Within said top grommet 90, a molded insert of metal 98 is disposed, to provide a base to which an outer enclosing metal bellows 99 may be suitably bonded, as by brazing or welding, around an annular border surface 100.

The function and purpose of the bellows 99 is to enclose the upper end 74A of the piston push rod 74 during normal conditions, when the reserve cell 10 is to remain unactivated and unused. When operation of the cell is desired, and the cell is to be activated, the bellows 99 permits the application of a pressure or impact force to be applied to the end 74A of the piston rod 74 to shear the shear pin 80 and thereupon release the compressed helical spring 72 to permit the spring 72 to impress a hydrostatic pressure force against the electrolyte to fracture the bottom floor button 36 in the lower cylinder 32 of the vial assembly, so the released electrolyte can be thereupon directed into the active electronic zone of the cell between anode and cathode to produce the electrical energy of the cell for delivery to an external circuit.

For connection to an external circuit the cathode can 12 provides a cathode terminal surface which may be established by direct physical surface contact, or an electrode terminal tab may be welded or soldered to the can. For electrical connection to the anode 30, a terminal tab 102 is schematically indicated as extending upward through the body of the insulating closure grommet 90 out to and beyond the external top surface 104 of the grommet. The plastic grommet 90 is shown with an integral annular ring 106 extending axially beyond, and concentrically around, the protective bellows 99 which surrounds the outer end of the piston rod 74. The function of that plastic extension ring 106 of the insulating grommet 90 is to provide physical protection for the bellows 99.

An additional feature herein, which permits fast transfer of the electrolyte to its active region, consists in the provision of a transfer vent 110 connecting a space 112 at the top of the electrode space at the upper end of the flutes 82, to the space within the upper plastic cylinder 34 representing the back space of the piston. Through the flutes and said vent 110, the back region of the piston is connected to the space into which the electrolyte at the front of the piston is to be forced, and any forward movement of the piston creates a partial vacuum or subnormal pressure in the region into which the electrolyte is to travel, thereby making it easy for the electrolyte to move quickly without encountering a cushioning or a resisting layer of air that would tend to delay forward movement of the electrolyte from its normal stored position, into the active position between the electrodes.

Thus, by means of the construction shown, as a preferred form of the invention, potential energy may be stored as a relatively balanced pressure system, which can be easily and readily released to permit the stored energy to function by the simple operation of shearing a small shearing pin which normally holds the force system balanced, as long as activation and operation of the cell are not desired.

It will be understood, of course, that the elements may be changed in shape and dimension and possible arrangement without departing from the spirit and scope of the invention as defined in the claims.

I claim:

1. A reserve electrolytic cell, comprising
an outer cathode can;
a cylindrical layer of depolarizer material lining the cathode can;
an absorbent material lining the depolarizer material;
a cylindrical anode engaging said absorbent material in spaced relation from said depolarizer;
a plastic vial assembly in a confined space axially within said anode, said vial being a cylinder open at the top and closed by other elements of said assembly including a pre-stressed spring, and means for restraining said spring in pre-stressed condition, and a movable piston to be movable by said spring when said restraint is removed and said vial normally containing a volume of electrolyte sealed within said vial by said movable piston, means outside of said vial for releasing said spring restraint when it is desired to release said electrolyte from the space within said anode to the space between said anode and said cathode to activate said cell second means outside of said vial to fracture said vial when the spring is released and the electrolyte is compressed;
and means providing a free path for fast traverse by the released electrolyte to move quickly into the operating space between anode and cathode, when the pre-stressed spring is released and permitted to activate said piston to cause accelerated movement of the released electrolyte.

2. A reserve cell, as in claim 1, in which
said vial is a hollow cylinder closed at its bottom end and open at its top end, with said bottom end formed to be frangible, and said piston being closely fitted in the vial adjacent said open top end;
and said spring is constructed and designed to axially press said piston against said electrolyte to establish hydrostatic pressure in the fluid electrolyte to fracture said vial bottom.

3. A reserve cell, as in claim 2, in which
said spring for axially pressing said piston includes
said spring normally compressed to store potential energy, while said cell is to be kept inactive;
means for holding said spring in compressed condition so long as said cell is to be kept inactive, and for releasing said spring when the cell is to be rendered active;
and means controlled by said spring for moving said piston to expel the stored electrolyte.

4. A reserve cell, as in claim 2, in which
said vial is a hollow cylinder; and
said piston consists of an elastomeric ring closely fitting the inner surface of said vial cylinder, and a center piece with a curved taper engaging the inner peripheral surface of said elastomeric ring and effective to impress a radially outward pressure against said ring to press the ring radially against said vial inner cylinder surface while pressing and advancing the ring axially against the electrolyte;
and said piston includes compression spring means, means for compressing and holding said spring means compressed to store potential energy, and means for releasing said compressed spring to permit said spring to press axially and move said piston and electrolyte hydrostatically against said frangible bottom end of said vial, to fracture said bottom end of said vial and express the electrolyte from said vial through said fractured bottom.

5. A reserve cell, as in claim 4, in which
said anode of claim 1 constitutes a cylinder with longitudinal grooves in the outer surface parallel to the axis of said cylinder, to enable the freed and expressed electrolyte from the vial to move quickly along the outer surface of said anode cylinder to wet and saturate the absorbent material between said anode and said depolarizer material.

6. A reserve cell, as in claim 5, in which
the air space between said anode and said cathode vents to the region behind said piston, whereby forward movement of said piston creates a partial vacuum in said air space that aids in pulling the released electrolyte upward into the slots on the outer surface of the anode cylinder.

7. A reserve cell, as in claim 1, comprising, further,
means for protectively enclosing said spring-restraining means that would cause undesired activation of said cell.

8. A reserve cell, as in claim 1, in which
said plastic vial assembly includes
a lower plastic cylinder closed at its bottom end and open at its top end;
an upper plastic cylinder open at top and bottom ends, with said bottom end dimensioned for and fitting snugly co-axially and concentrically onto said open top end of said lower plastic cylinder, and said lower and upper cylinders being sealed along said surface fitting co-axially and concentrically;
a volume of electrolyte in said lower plastic cylinder;
an elastomeric ring fitting snugly in said lower plastic cylinder beneath the lower end of said upper plastic cylinder;
a piston pressure plate fitting centrally within said elastomeric ring and having a peripheral taper to press radially outward on said ring while pressing axially forward on said ring.

References Cited

UNITED STATES PATENTS

| | | | |
|---|---|---|---|
| 3,484,297 | 12/1969 | Zaleski | 136—114 |
| 2,502,723 | 4/1950 | Harriss | 136—113 |
| 2,682,567 | 6/1954 | Porter | 136—113 |
| 2,918,515 | 12/1959 | Lawson | 136—90 |
| 2,918,517 | 12/1959 | Everett | 136—90 |

WINSTON A. DOUGLAS, Primary Examiner

C. F. LE FEVOUR, Assistant Examiner

U.S. Cl. X.R.

136—90